US 11,119,743 B1
Sep. 14, 2021

(12) United States Patent
Douglas et al.

(54) BUILD TIME OPTIMIZATION USING THREAD OBJECT VARIABLES

(71) Applicant: Red Hat, Inc., Raleigh, NC (US)

(72) Inventors: Stuart Douglas, Orange (AU); Jason Greene, Madison, WI (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/032,682

(22) Filed: Sep. 25, 2020

(51) Int. Cl.
*G06F 8/41* (2018.01)
*G06F 16/907* (2019.01)
*G06F 9/48* (2006.01)

(52) U.S. Cl.
CPC ............... *G06F 8/45* (2013.01); *G06F 8/427* (2013.01); *G06F 9/4881* (2013.01); *G06F 16/907* (2019.01)

(58) Field of Classification Search
None
See application file for complete search history.

(56) References Cited

U.S. PATENT DOCUMENTS

| | | | | |
|---|---|---|---|---|
| 6,240,440 | B1 * | 5/2001 | Kutcher ................ | G06F 9/4856 718/102 |
| 7,689,971 | B2 * | 3/2010 | Peng ....................... | G06F 9/52 717/120 |
| 7,954,100 | B1 | 5/2011 | Garthwaite | |
| 9,274,840 | B2 | 3/2016 | Dawson et al. | |
| 10,133,660 | B2 | 11/2018 | Ostrovsky et al. | |
| 2005/0183078 | A1 * | 8/2005 | Shi ........................ | G06F 9/4484 717/149 |
| 2009/0172652 | A1 * | 7/2009 | Simon ..................... | G06F 8/443 717/148 |
| 2009/0187725 | A1 * | 7/2009 | Mencias .............. | G06F 9/44557 711/171 |

(Continued)

FOREIGN PATENT DOCUMENTS

CN        110609680        12/2019

OTHER PUBLICATIONS

Zhang, "Implementation and Optimization of Thread-Local Variables for a Race-Free Java Dialect", School of Computer Science, McGill University, Montreal, Dec. 2011 (77 pages).

(Continued)

*Primary Examiner* — Philip Wang
(74) *Attorney, Agent, or Firm* — K&L Gates LLP

(57) ABSTRACT

A system includes a memory and a processor, where the processor is in communication with the memory. The processor is configured to retrieve data structure metadata from a source code of an application. Each of the complex thread variables are registered and an object is generated that is accessible from a thread initiated during execution of the application. At least one thread object implementation is generated within the object, where each of the thread object implementation corresponds to each of the complex thread variables referenced within the source code. Next, the processor is configured to modify an implementation of the source code of the application to call the at least one thread object implementation when attempting to access one or more complex thread variables referenced within the source code. Next, the source code is compiled into an object code corresponding to the application, where the object code includes the object.

20 Claims, 4 Drawing Sheets

(56) References Cited

U.S. PATENT DOCUMENTS

| | | | |
|---|---|---|---|
| 2011/0131559 A1* | 6/2011 | Young | G06F 8/458 |
| | | | 717/145 |
| 2012/0239698 A1* | 9/2012 | Ohtake | H04L 67/02 |
| | | | 707/781 |
| 2016/0275010 A1* | 9/2016 | Ostrovsky | G06F 9/5016 |
| 2017/0090997 A1* | 3/2017 | Bohm | G06F 8/36 |

OTHER PUBLICATIONS

"Fast Thread Local in Netty", Programmer Sought, 2020 (18 pages).
Kim et al., "DEX: Scaling Applications Beyond Machine Boundaries", Ajou University Suwon, South Korea; Virginia Tech Blacksburg, USA; The University of Manchester, UK (13 pages).

* cited by examiner

BUILD TIME OPTIMIZATION USING THREAD OBJECT VARIABLES

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices.

The containers may encapsulate a runtime environment for an application instance or service. Application instances may be started or replicated across nodes and each application instance may require configuration objects (e.g., lists, collections, arrays, etc. used for configuration), classes, artifacts, dependencies, annotations, libraries, etc. to be loaded at various times.

SUMMARY

The present disclosure provides new and innovative systems and methods for optimizing applications at build time. In an example, a method includes retrieving data structure metadata from a source code of an application, where the data structure metadata includes one or more complex thread variables referenced within the source code. Each of the complex thread variables are registered and an object is generated and is accessible from a thread initiated during execution of the application. At least one thread object implementation is generated within the object that corresponds to each of the one or more complex thread variables referenced within the source code. An implementation of the source code is modified to call the at least one thread object implementation when attempting to access one or more complex thread variables referenced within the source code. Next, the source code is compiled into an object code corresponding to the application, where the object code includes the object.

In an example, a system includes a memory and a processor. The processor is in communication with the memory. The processor is configured to retrieve data structure metadata from a source code of an application, where the data structure metadata includes one or more complex thread variables referenced within the source code. Each of the complex thread variables are registered and an object is generated that is accessible from a thread initiated during execution of the application. At least one thread object implementation is generated within the object, where each of the thread object implementation corresponds to each of the complex thread variables referenced within the source code. Next, the processor is configured to modify an implementation of the source code of the application to call the at least one thread object implementation when attempting to access one or more complex thread variables referenced within the source code. Next, the source code is compiled into an object code corresponding to the application, where the object code includes the object.

In an example, a non-transitory machine readable medium storing code, when executed by a processor, is configured to retrieve data structure metadata from a source code of an application, where the data structure metadata includes one or more complex thread variables referenced within the source code. Each of the one or more complex thread variables are registered and an object accessible from a thread initiated during execution of the application is generated. At least one thread object implementation is generated, where the one thread object implementation corresponds to each of the one or more complex thread variables referenced within the source code. Next, an implementation of the source code of the application is modified to call the at least one thread object implementation when attempting to access one or more complex thread variables referenced within the source code. The source code is then compiled into an object code corresponding to the application, where the object code includes the object.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
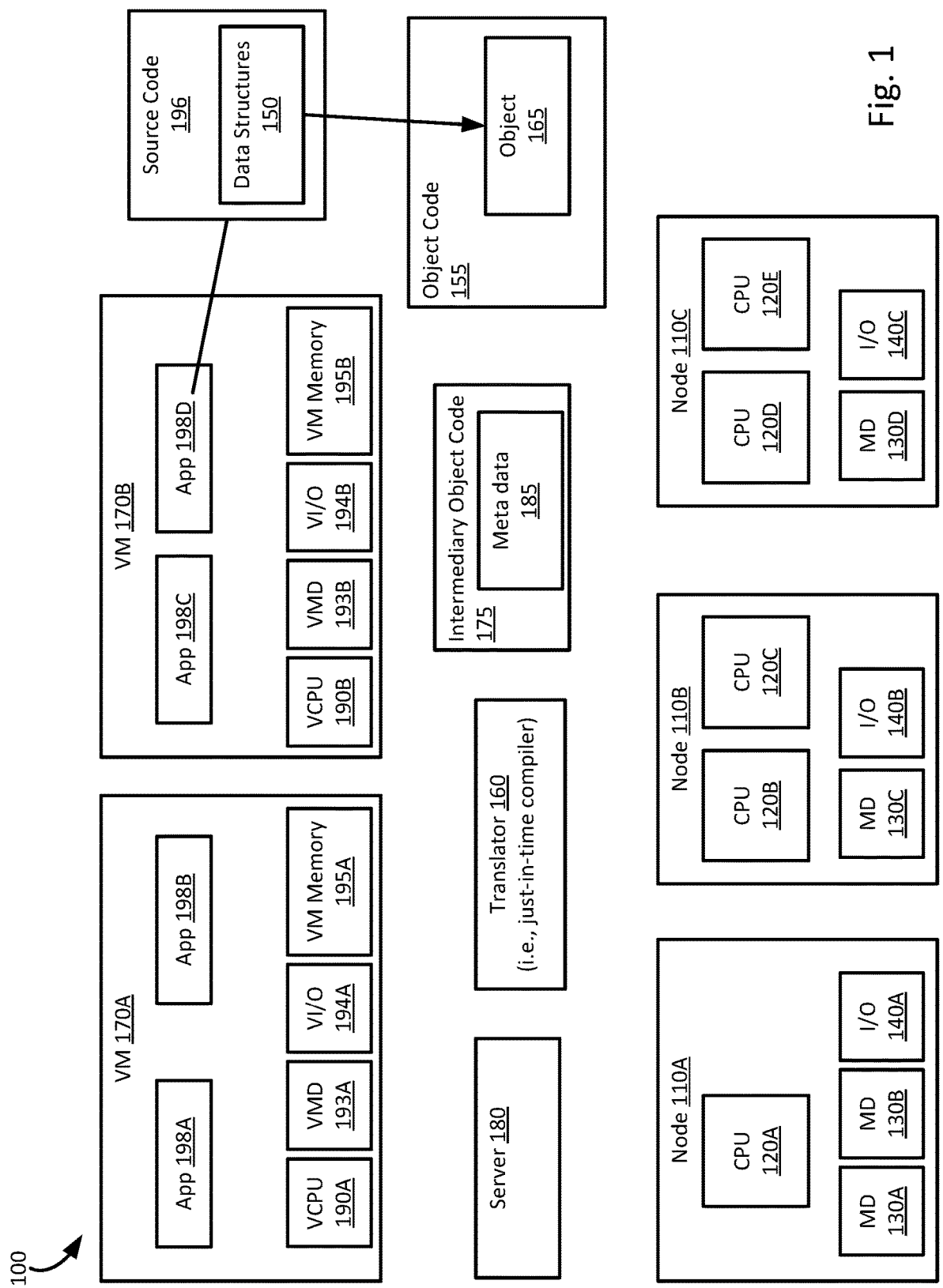
FIG. 1 illustrates a high level component diagram of an example computing system in accordance with one or more aspects of the present disclosure.

Techniques are disclosed for implementing build time optimizations to applications. Traditionally, Java applications use "threadlocal" variables to store state information related to a request of a currently executing thread. Typically, state information commonly includes things such as the current transaction, the current user, and the CDI request context, but can store any information needed by a particular thread. Generally, Java's "threadlocal" implementation allows these values to be available at any point in the execution of the request within a thread without the programmer needing to explicitly pass them around within the thread. Unfortunately, typically as implemented within Java, "threadlocal" objects are not efficient, and impose overhead in their use.

Generally, when implementing a blocking request model, the us of a "threadlocal" implementation is not an issue as these "threadlocal" variables are usually only accessed a small number of times per request. However, typically, when using "threadlocal" variables in context of a reactive application, problems arise. For example, typically, a blocking request model involves synchronous input/output (I/O) where a function call cannot return until the function has been completed. In these instances, since the blocking request model itself is slower due to waiting for a response, any delays caused by the "threadlocal" implementation are less likely to be an issue. In comparison, a "threadlocal" implementation has a greater effect on reactive applications. For example, a reactive application, using asynchronous I/O, may receive hundreds or thousands of requests in a short period of time without any requestors having to wait for a response. Further, since each thread or process is not blocked, each requestor can continue processing and potentially creating more asynchronous requests. An environment where requests can multiply quickly and where each request accesses a "threadlocal" variable can cause a huge slowdown in performance of an application.

In another example, in many instances, an application in a reactive context may save and restore relevant local thread context more often (e.g., hundreds or thousands of transactions). In these instances, for a request that performs a model number of reactive operations (e.g., flat map, etc.), the overhead associated with complex thread variables quickly becomes a barrier to writing performant systems (e.g., MP context propagation spec used with Vert.x and mutiny). While some optimization can be made to improve efficiency of the application, typically, the core of the problem is that complex variable implementations are slow. In various instances, this issue with Java's "threadlocal" implementation may be generally applicable to other development languages using one or more complex data structures within thread implementations.

As described in various examples disclosed herein, to advance build time optimization techniques for developing applications, the systems and methods disclosed herein advantageously analyzes and processes applications during a build process to minimize response time of the application. In various examples, a thread object implementation may be created and may be used to replace existing complex thread variable implementations (e.g., "threadLocal" implementation within Java). In these examples, at build time, a system may register one or more complex thread variables used by any portion of an application with a build engine, compiler, and/or translator building a Java application. In various examples, values of the complex thread variables may be stored for use during runtime of the application. In some instances, a compiler may retrieve the complex thread variables from source code of an application. In other instances, a compiler may retrieve complex thread variables from one or more input files associated with an application. In certain instances, a compiler may pre-compile source code of an application into an intermediary object code form and may query the intermediary object code for any complex thread variables used within the application. In most instances, complex thread variables may be used to describe complex data structures implemented when using threads, such as Java's "threadlocal" implementation.

In various examples, once the complex thread variable information has been retrieved from an application, a compiler (e.g., build engine, translator) may generate a context object or that contains a field for each value to be stored. In many examples, context object may be used interchangeable with thread object. In some instances, with regards to Java, a subclass of Java.lang.Thread may be used by the application that has a field to directly store the context implementation. In certain instances, a thread may be generated to store the context information. In various instances, a context object may include one or more objects, where each of the one or more objects represents complex thread variables from a single thread used during runtime of the application. In most instances, source code of an application may be modified to use and/or call the generated local thread implementation, which properly may access the context object, or sub-objects, directly. In these instances, running the modified source code may enable accessing of local complex thread variables directly via a field access. For example, a generated local thread implementation in Java may look like the following line of source code:

User user=((MyThread)thread.currentThread( )).context.currentUserGeneratedField;

In most instances, this implementation of a generated object including generated implementations for complex thread variables (e.g., "threadlocal" variables) may be up to three times faster than existing approaches and/or implementations. Additionally, in various instances, an ancillary benefit of this approach is that the generated objected, or sub objects, may be saved and/or restored by reading or writing the context object, or sub-objects, on the thread, further simplifying use of information previously accessible from the original complex thread variable implementation.

FIG. 1 depicts a high-level component diagram of an example computing system 100 in accordance with one or more aspects of the present disclosure. The computing system 100 may include a server 180, translator 160, one or more virtual machines (VM 170A-B), and nodes (e.g., nodes 110A-C).

In an example, Applications 198A-D may be different applications or services. In another example, applications 198A-D may be different instances of the same application or service. In various examples, each application 198 may include source code 196 which may contain data structures 150 (e.g., current user, current HTTP Request, current transaction). In certain examples, intermediary object code 175 built from source code 196 may include metadata 185 associated with the data structures 150. In various instances, a translator 160 may be operable to build the object code 155 based on the source code 196. In these instances, the object code 155 may include additional objects 165 based on the data structures 150 in place of complex thread variables (i.e., "threadlocal" variables). In various instances, the object code 155 may include modified implementations of the source code 196 to make use of the objects 165.

Virtual machines 170A-B may include a virtual machine memory (VM Memory), a virtual CPU (VCPU), virtual memory devices (VMD), and virtual input/output devices (VI/O). For example, virtual machine 170A may include virtual machine memory 195A, a virtual CPU 190A, a virtual memory devices 192A, and a virtual input/output device 194A. Similarly, virtual machine 170B may include virtual machine memory 195B, a virtual CPU 190B, a virtual memory devices 192B, and virtual input/output device 194B.

Translator 160 may be a dynamic translator. In an example, translator 160 may be a compiler, such as a just-in-time ("JIT") compiler. The translator may compile code 196 to create intermediary object code 175 and/or object code 155. In various instances, the translator 160 may query the intermediary object code for metadata 185 and/or information related to the data structures 150. The translator 160 may also generate an intermediate representation from the deployment model, such as bytecode (e.g., JVM bytecode). The bytecode may bootstrap runtime services by directly calling runtime classes when the bytecode is executed. In an example, the translator 160 may translate bytecode into machine code for the virtual machines 170A-B at runtime. The translator 160 may be a program running on a processor (e.g., CPU 120A-E or VCPU 190A-B). For example, VCPU 190A and VCPU 190B may each have their own translator that runs on the processor.

In an example, a virtual machine 170A may execute a guest operating system and run applications 198A-B which may utilize the underlying VCPU 190A, VMD 192A, and VI/O device 194A. One or more applications 198A-B may be running on a virtual machine 170A under the respective guest operating system. A virtual machine (e.g., VM 170A-B, as illustrated in FIG. 1) may run on any type of dependent, independent, compatible, and/or incompatible applications on the underlying hardware and operating system ("OS"). In an example, applications (e.g., App 198A-B) run on a virtual machine 170A may be dependent on the underlying hardware and/or OS. In another example embodiment, applications 198A-B run on a virtual machine 170A may be independent of the underlying hardware and/or OS. For example, applications 198A-B run on a first virtual machine 170A may be dependent on the underlying hardware and/or OS while applications (e.g., application 198C-D) run on a second virtual machine (e.g., VM 170B) are independent of the underlying hardware and/or OS. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186.

In an example, virtual machines 170A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-D or services (e.g., microservices) may run in a software container or a virtual machine (e.g., virtual machines 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
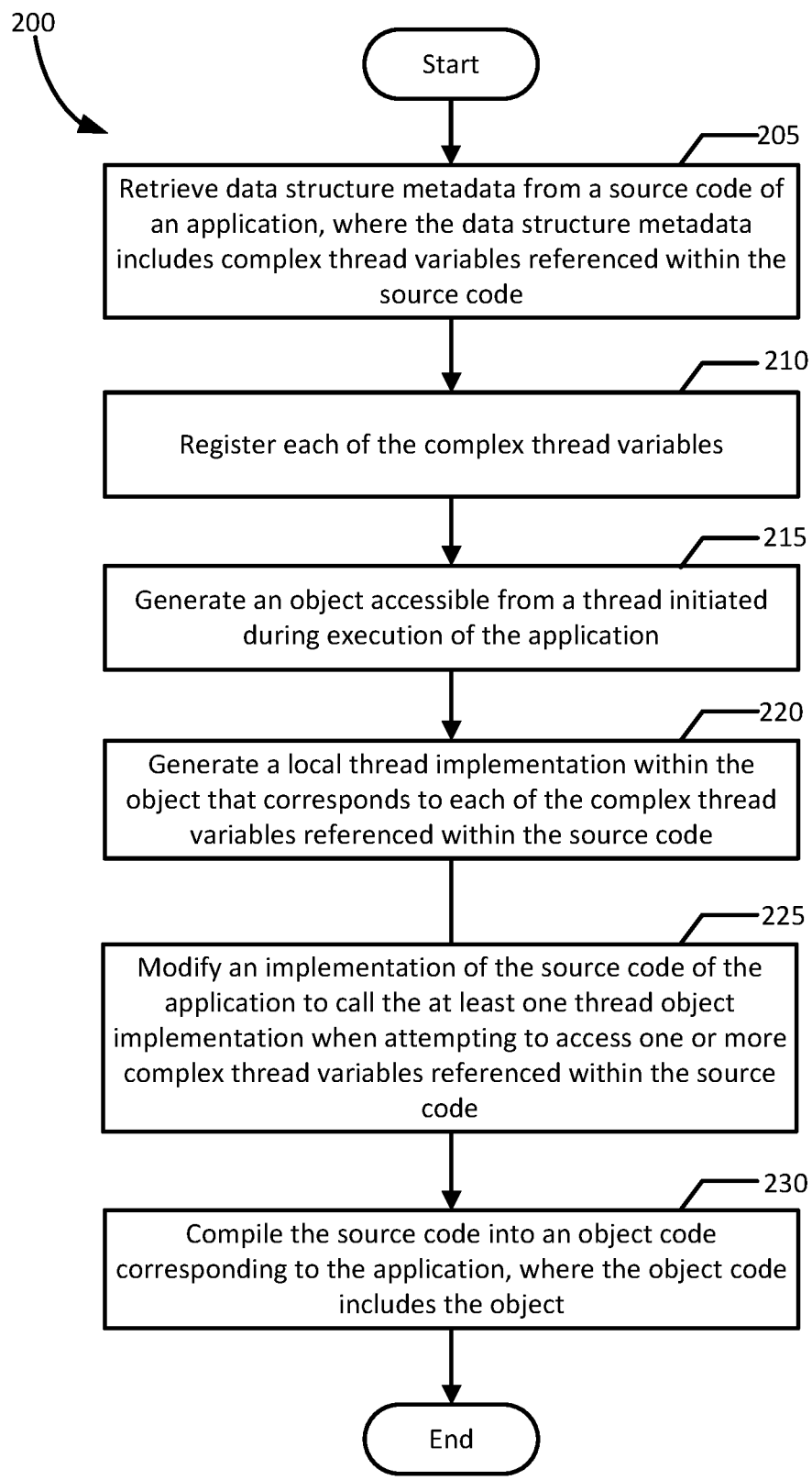
FIG. 2 illustrates a flowchart of an example method for optimizing an application according to an example embodiment of the present disclosure.

FIG. 2 illustrates a flowchart of an example method for optimizing the use of generated objects in place of complex thread variables at build time, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks described are optional. The method 200 may be performed by processing logic that may comprise hardware (circuitry, dedicated logic, etc.), software, or a combination of both.

In this example, an application 198 is optimized to reduce the response time of the application 198 during runtime. A compiler retrieves data structure metadata from a source code of an application, where the data structure metadata includes complex thread variables referenced within the source code (block 205). For example, source code 196 includes data structures 150 for performing various services and/or functions during execution of the application 198. In these instances, a portion of these data structures 150 are accessed from within threads. In various instances, complex thread variables may be implemented using inefficient implementations (e.g., a hash table, mapping, etc.). The translator 160 may retrieve one or more portions of the data structures 150 that are complex thread variables. In various instances, the translator 160 may parse the source code 196 of the application 198 to obtain the one or more portions of the data structures 150 that are complex thread variables. In certain instances, an input file may be included along with the source code 196. In these instances, the translator 160 may retrieve, read, and/or obtain the one or more portions of the data structures 150 that are complex thread variables from the input file.

The translator, then, registers each of the complex thread variables (block 210). For example, the translator 160 is able to store each complex thread variable in a searchable database and/or structure that any thread within an application 198 can access. In certain instances, the searchable database and/or structure may be a point of access for each variable previously stored as a complex thread variable. Next, the translator generates an object accessible from a thread initiated during execution of the application (block 215). For example, the translator 160 retrieves one or more portions of the data structures 150 from the application 198 and creates an object 165 within the object code 155. In these instances, the object 165 may be globally accessible during execution of the application 198. In certain instances, the object 165 may only be accessible from within a thread during execution of the application 198. In many instances, a thread executing during runtime of the application 198 may be able to access the object 165 using a database of registered complex thread variables. In most instances, each query of the object 165 may be relative to the thread, function, and/or service requesting information from the object 165.

Next, a local thread implementation is generated within the object that corresponds to each of the complex thread variables referenced within the source code (block 220). For example, each instance of a complex thread variable referenced within the data structures 150 of the source code 196 are used to generate one or more sub objects included within object 165. However, instead of using a complex thread variable (e.g., "threadlocal" variable) implementation, the object 165 implements the one or more sub objects with variables as fields. In most instances, the application 198 may benefit from decreased access response time (i.e., setting and getting the variable is faster) over a hash map implementation. In other instances, a field implementation of local thread variables may also simplify the use of the variables as well. For example, an entire local thread implementation as a sub object within the object 165 can be set and/or gotten with a single operation on the entire object implementation instead of setting and getting each complex thread variable, as originally implemented within the application 198. Next, an implementation of the source code of the application is modified to call the new object when the application attempts to access any variables that were previously complex thread variables within the source code (block 225). For example, before the translator 160 compiles the application 198, the translator may modify portions of the source code to reference the object 165. In some embodiments, the translator 160 may be able to modify portions of the bytecode to reference the object 165. Without these modifications, the application 198 would be unable to reference the object 165 during runtime of the application 198. Next, the translator compiles the source code into an object code corresponding to the application, where the object code includes the object (block 230). For example, once the complex thread variables are registered and generated, the translator 160 compiles the source code 196 into object code 155, which includes the object 165. In these instances, the object 165 includes all of the complex thread variables previously existing and/or references within the original source code 196. Additionally, the Object 165 may be accessible from any thread within the application 198. Further, the object code 155 is fully modified to use the object 165 in place of the original references to complex thread variables.

Figure 3:
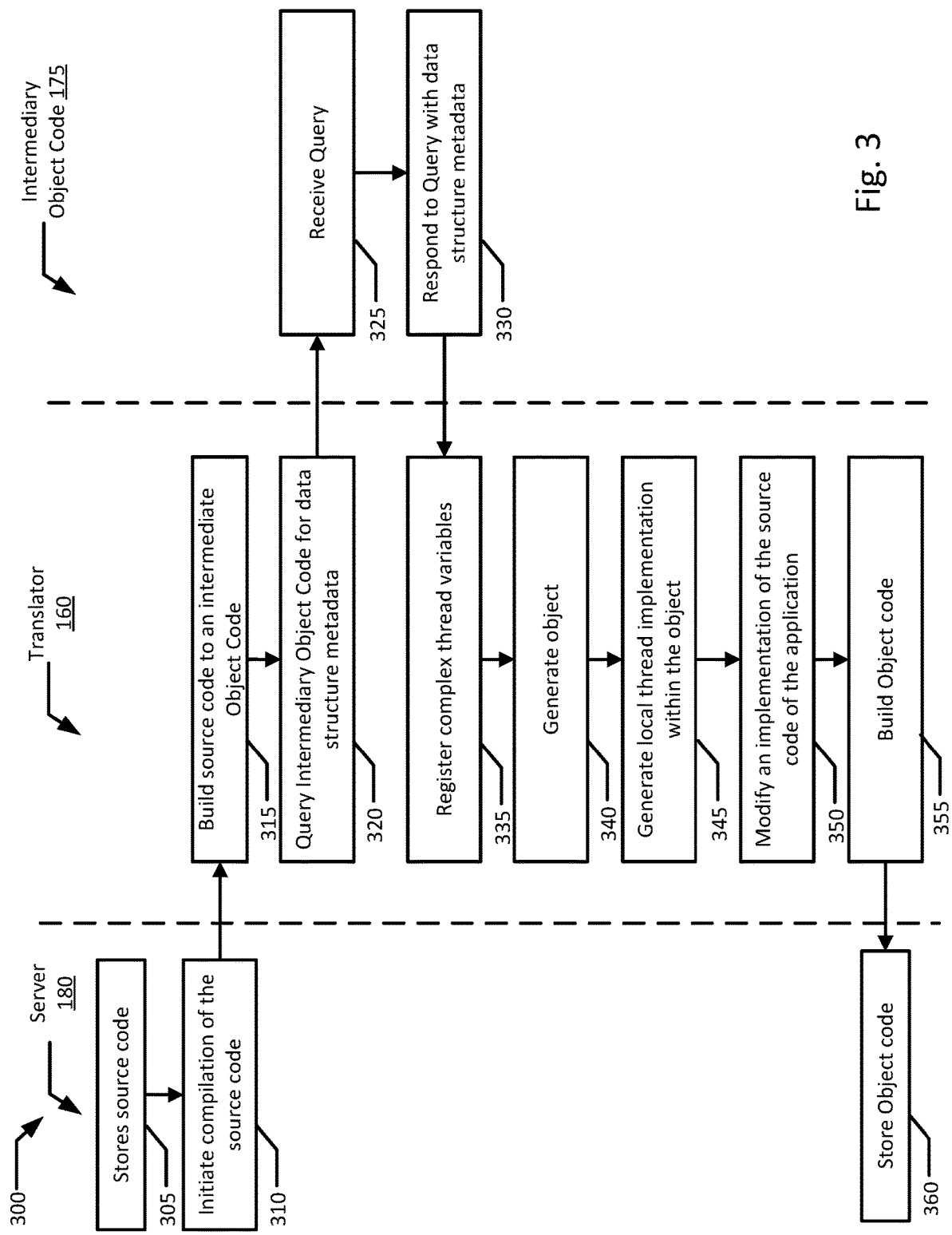
FIG. 3 illustrates a flow diagram of an example method of optimizing an application using an intermediary object code, in accordance with an embodiment of the present disclosure.

FIG. 3 illustrates a flow diagram of an example method of optimizing the use of local thread variables at build time of an application, in accordance with an embodiment of the present disclosure. Although the example method 300 is described with reference to the flow diagram illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. For example, in the illustrated flow diagram, a server 180 utilizes a translator 160 to build object code 155 for the application 198.

As shown in FIG. 3, the server 180 stores the source code 196 (block 305) and initiates compilation of the source code 196 (block 310). Upon receiving the source code 196, the translator 160 builds an intermediary object code 175 from the source code 196 (block 315). In various instances, translator 160 may be used interchangeably with compiler. In these instances, the intermediary object code 175 may be executable and may be able to handle requests from the translator 160. The translator 160 queries the intermediary object code 175 for data structure metadata 185 (block 320). In this instance, data structure metadata 185 includes each instance of the application using complex thread variables during runtime. The intermediary object code 175 receives the query (block 325) and responds to the query with data structure metadata 185 from the source code 196 (block 330). In most instances, the data structure metadata 185 may include data structures 150 and/or values of one or more fields within the data structures 150. Upon receiving the data structure metadata 185 from the intermediary object code 175, the translator 160 registers the complex thread variables (block 335), which may include storing values and/or states of each of the complex thread variables.

Next, the translator 160 generates an object 165 that will be accessible during runtime of the application 198 (block 340). In most examples, a thread requiring data from a complex thread variable may access the generated object 165 to retrieve the data. The translator 160 then generates local thread implementations within the object 165 (block 345). For example, in many instances, each complex thread variable originally within the source code may have a specific local thread implementation within the object 165. As such, any thread executing during runtime of the application 198 can access its own data. Next, the translator modifies an implementation of the source code 196 of the application 198 (block 350). For example, modifications to the source code 196 and/or the final object code 155 allow threads within the application 198 to access the newly generated object 165 and local thread implementations within the object 165. Without these modifications, the application 198 would revert to its original state referencing the existing complex thread implementations. Upon completion of the modifications, the translator 160 builds the object code 155 (block 355) and the server 180 stores the object code (block 360).

Figure 4:
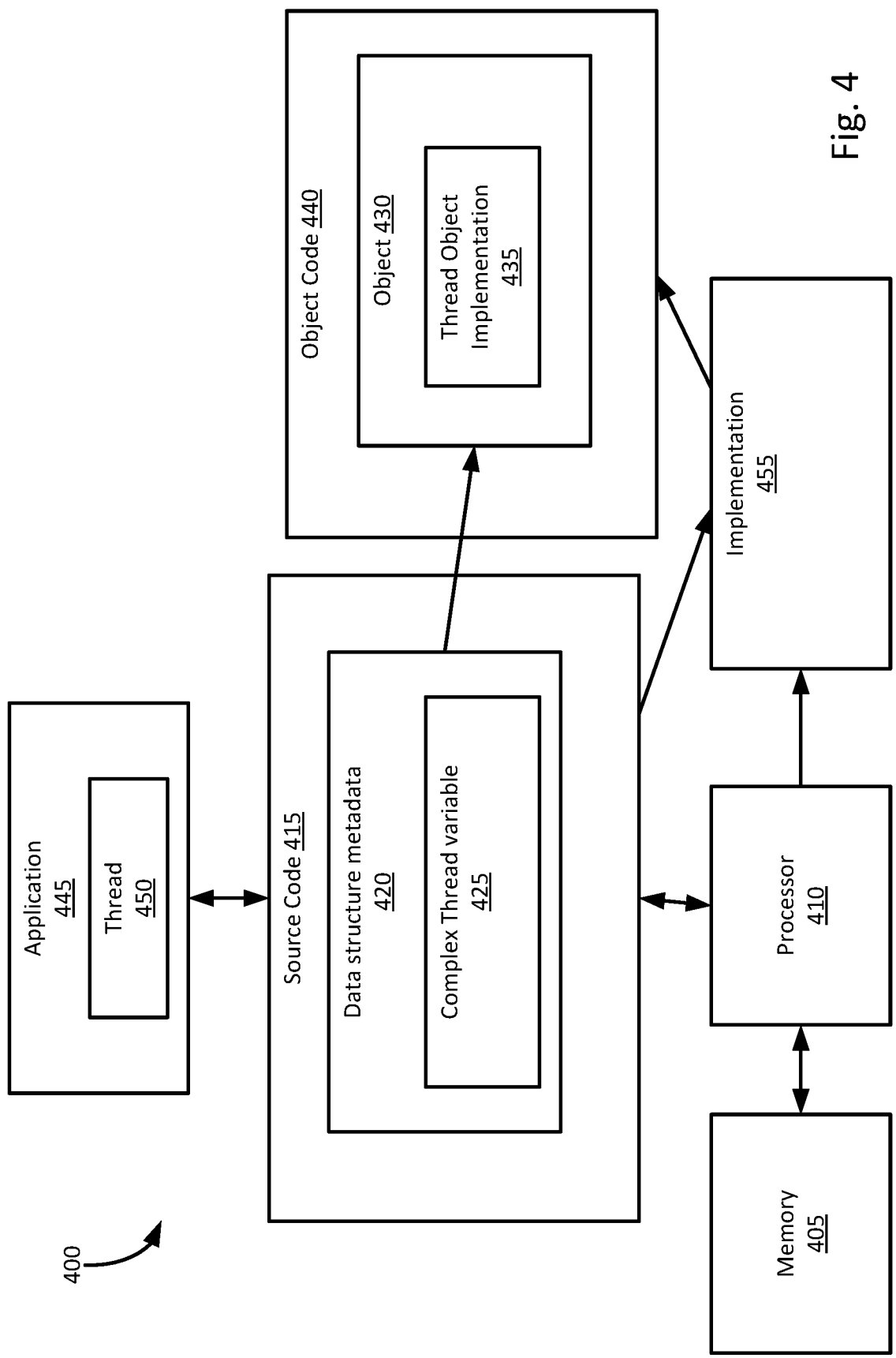
FIG. 4 illustrates a block diagram of an example system optimizing and modifying an application to decrease system overhead while executing an application according to an example embodiment of the present disclosure.

FIG. 4 is a block diagram of system 400, which includes memory 405 and processor 410. The processor 410 is in communication with the memory 405. The processor 410 is configured to retrieve data structure metadata 420 from a source code 415 of an application 445, where the data structure metadata 425 includes complex thread variables 425 referenced within the source code 415. Each of the complex thread variables 425 are registered. An object 430 is generated that is accessible from a thread 450 initiated during execution of the application 445. At least one thread object implementation 435 within the object 440 that corresponds to each of the one or more complex thread variables 425 referenced within the source code 415. The source code 415 is modified with an implementation 455 of the application 445 that calls at least one thread object implementation when attempting to access one or more local thread variables 425 referenced within the source code 415. Next, the source code 415 is compiled into an object code 440 corresponding to the application 445 where the object code 440 includes the object 430.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
a memory; and
a processor in communication with the memory, wherein the processor is configured to:
retrieve data structure metadata from a source code of an application, wherein the data structure metadata includes one or more complex thread variables referenced within the source code;
register each of the one or more complex thread variables;
generate an object accessible from a thread initiated during execution of the application;
generate at least one thread object implementation within the object that corresponds to each of the one or more complex thread variables referenced within the source code;
modify an implementation of the source code of the application to call the at least one thread object implementation when attempting to access one or more complex thread variables referenced within the source code; and
compile the source code into an object code corresponding to the application, wherein the object code includes the object.

2. The system of claim 1, wherein retrieving data structure metadata comprises:
parsing the source code of the application to retrieve the data structure metadata.

3. The system of claim 1, wherein retrieving data structure metadata comprises:
compiling the source code into an intermediary object code; and
requesting the data structure metadata from the intermediary object code.

4. The system of claim 1, wherein retrieving data structure metadata comprises:
reading an input file associated with the source code of the application to retrieve the data structure metadata associated with the source code.

5. The system of claim 1, wherein a first complex thread variable of the one or more complex thread variables is a local thread state existing during an execution of the application.

6. The system of claim 1, wherein a first complex thread variable of the one or more complex thread variables is a transaction.

7. The system of claim 1, wherein a first complex thread variable of the one or more complex thread variables is a CDI request context.

8. The system of claim 1, wherein a first complex thread variable of the one or more complex thread variables is a set of objects tied to a thread operating during execution of the application.

9. The system of claim 1, wherein registering includes storing a value associated with at least one of the one or more complex thread variables.

10. A method, comprising:
retrieving data structure metadata from a source code of an application, wherein the data structure metadata includes one or more complex thread variables referenced within the source code;
registering each of the one or more complex thread variables;
generating an object accessible from a thread initiated during execution of the application;
generating at least one thread object implementation within the object that corresponds to each of the one or more complex thread variables referenced within the source code;
modifying an implementation of the source code of the application to call the at least one thread object implementation when attempting to access one or more complex thread variables referenced within the source code; and
compiling the source code into an object code corresponding to the application, wherein the object code includes the object.

11. The method of claim 10, wherein retrieving data structure metadata comprises:
parsing the source code of the application to retrieve the data structure metadata.

12. The method of claim 10, wherein retrieve data structure metadata comprises:
compiling the source code into an intermediary object code; and
requesting the data structure metadata from the intermediary object code.

13. The method of claim 10, wherein retrieving data structure metadata comprises:
reading an input file associated with the source code of the application to retrieve the data structure metadata associated with the source code.

14. The method of claim 10, wherein a first complex thread variable of the one or more complex thread variables is a local thread state existing during an execution of the application.

15. The method of claim 10, wherein a first complex thread variable of the one or more complex thread variables is a set of objects tied to a thread operating during execution of the application.

16. The method of claim 10, wherein registering includes storing a value associated with at least one of the one or more complex thread variables.

17. A non-transitory machine readable medium storing code, which when executed by a processor is configured to:
retrieve data structure metadata from a source code of an application, wherein the data structure metadata includes one or more complex thread variables referenced within the source code;
register each of the one or more complex thread variables;
generate an object accessible from a thread initiated during execution of the application;
generate at least one thread object implementation within the object that corresponds to each of the one or more complex thread variables referenced within the source code;
modify an implementation of the source code of the application to call the at least one thread object implementation when attempting to access one or more complex thread variables referenced within the source code; and
compile the source code into an object code corresponding to the application, wherein the object code includes the object.

18. The non-transitory machine readable medium storing code of claim 17, wherein retrieving data structure metadata comprises:
 parsing the source code of the application to retrieve the data structure metadata.

19. The non-transitory machine readable medium storing code of claim 17, wherein retrieving data structure metadata comprises:
 compiling the source code into an intermediary object code; and
 requesting the data structure metadata from the intermediary object code.

20. The non-transitory machine readable medium storing code of claim 17, wherein retrieving data structure metadata comprises:
 reading an input file associated with the source code of the application to retrieve the data structure metadata associated with the source code.

\* \* \* \* \*